(12) United States Patent
Tsukidate et al.

(10) Patent No.: US 11,112,116 B2
(45) Date of Patent: Sep. 7, 2021

(54) GAS TURBINE COMBUSTOR AND GAS TURBINE

(71) Applicant: Mitsubishi Power, Ltd., Yokohama (JP)

(72) Inventors: Hironori Tsukidate, Yokohama (JP); Kunihiro Oga, Yokohama (JP); Yoshitaka Terada, Yokohama (JP); Koichi Nishida, Yokohama (JP)

(73) Assignee: Mitsubishi Power, Ltd., Yokohama (JP)

( * ) Notice: Subject to any disclaimer, the term of this patent is extended or adjusted under 35 U.S.C. 154(b) by 84 days.

(21) Appl. No.: 16/719,262

(22) Filed: Dec. 18, 2019

(65) Prior Publication Data

US 2020/0271321 A1   Aug. 27, 2020

(30) Foreign Application Priority Data

Feb. 27, 2019   (JP) .............................. JP2019-034570

(51) Int. Cl.
  *F23R 3/28*   (2006.01)
  *F02C 7/22*   (2006.01)
  *F23R 3/46*   (2006.01)

(52) U.S. Cl.
  CPC ................. *F23R 3/28* (2013.01); *F02C 7/22* (2013.01); *F02C 7/222* (2013.01);
  (Continued)

(58) Field of Classification Search
  CPC ................................... F02C 7/222; F23R 3/46
  See application file for complete search history.

(56) References Cited

U.S. PATENT DOCUMENTS 10,094,567 B2   10/2018   Igarashi et al.
10,408,457 B2   9/2019   Akiyama et al.
(Continued)

FOREIGN PATENT DOCUMENTS

CN   104456629 A   3/2015
CN   106705121 A   5/2017
(Continued)

OTHER PUBLICATIONS

German-language Office Action issued in German Application No. 10 2019 219 686.1 dated Mar. 24, 2021 with partial English translation (thirteen (13) pages).
(Continued)

*Primary Examiner* — Todd E Manahan
*Assistant Examiner* — Alyson Joan Harrington
(74) *Attorney, Agent, or Firm* — Crowell & Moring LLP

(57) ABSTRACT

The present invention reduces thermal stress that is applied to the weld zone of a cavity formed in the structural material of a burner. The burner includes the cavity distributing a fuel to fuel nozzles. The cavity is demarcated by a groove formed in the structural material of the burner so as to create a level difference at an opening, and a cover fitted into the level difference to close the groove. The cover is formed by a web covering the opening in the groove and a flange extending in the depth direction of the groove to be fitted into the level difference, and is joined by welding to the structural material in such a manner as to have an L-shaped cross-section. When viewed in a cross-section orthogonal to the groove, a cover-side inner surface that is an inner surface of the flange forming a lateral surface of the cavity is flush with a groove-side inner surface that is an inner surface of the groove forming a lateral surface of the cavity. The boundary between the cover-side inner surface and the groove-side inner surface is away from a first corner of the cavity
(Continued)

sandwiched between the cover-side inner surface and the inner surface of the web forming a ceiling surface of the cavity.

8 Claims, 5 Drawing Sheets

(52) U.S. Cl.
CPC ............ *F05D 2240/35* (2013.01); *F23R 3/46* (2013.01); *F23R 2900/00005* (2013.01)

(56) References Cited

U.S. PATENT DOCUMENTS

| | | |
|---|---|---|
| 2007/0204621 A1 | 9/2007 | Fish |
| 2010/0115966 A1 | 5/2010 | Nagai et al. |
| 2015/0226127 A1* | 8/2015 | Powell ..................... F23R 3/10 60/739 |
| 2018/0003386 A1 | 1/2018 | Wadayama et al. |
| 2018/0086093 A1 | 3/2018 | Sugiura |
| 2020/0271321 A1 | 8/2020 | Tsukidate et al. |

FOREIGN PATENT DOCUMENTS

| | | |
|---|---|---|
| CN | 107559880 A | 1/2018 |
| CN | 108700300 A | 10/2018 |
| JP | 2008-25910 A | 2/2008 |

OTHER PUBLICATIONS

Corresponding Chinese Office Action dated Jun. 1, 2021 (7 pages).

* cited by examiner

GAS TURBINE COMBUSTOR AND GAS TURBINE

BACKGROUND OF THE INVENTION

1. Field of the Invention

The present invention relates to a gas turbine combustor and a gas turbine.

2. Description of the Related Art

A combustor for a gas turbine receives compressed air discharged from a compressor, burns a fuel mixed with the compressed air to generate a combustion gas, and supplies the generated combustion gas to a turbine. In general, the fuel is injected into a combustion chamber from a plurality of fuel nozzles. Therefore, in some cases, the structural material of a burner has a cavity, or manifold, for distributing the fuel to each fuel nozzle, refer to JP-2008-025910-A and the like.

SUMMARY OF THE INVENTION

The structural material of the burner comes into contact with the compressed air supplied from the compressor. The compressed air supplied from the compressor has a high temperature of approximately 450 degrees. Meanwhile, the fuel supplied to the cavity has a normal temperature of approximately ten or more degrees. There is a great temperature difference between the fuel and the compressed air. Therefore, in the vicinity of the cavity, the structural material is affected by thermal stress caused by the temperature difference between the fuel and the compressed air. The thermal stress can be reduced by preheating the fuel and supplying the preheated fuel to the cavity. Preheating the fuel, however, requires facilities and energy.

Incidentally, the cavity is formed, for example, by creating a recess in the structural material of the burner and installing a flat cover over the recess. In this instance, when the interface between the structural material and the cover has an inlay structure, the contact surfaces between the structural material and the cover are L-shaped as viewed cross-sectionally. The cover needs to be securely fastened by welding to the structural material. However, if the L-shaped contact surfaces between the structural material and the cover are partly left unwelded, the unjoined contact surfaces face a corner of the cavity. It can be said that the unjoined contact surfaces form a so-called crack. When there is a crack in the wall surface of the cavity, particularly at a corner at which thermal stress concentrates, the weld zone is affected by significant stress through the crack.

The present invention provides a gas turbine combustor and a gas turbine that are capable of reducing thermal stress applied to the weld zone of a cavity formed in the structural material of a burner.

According to an aspect of the present invention, there is provided a gas turbine combustor that receives compressed air discharged from a compressor, mixes the compressed air with a fuel, burns a mixture of the compressed air and the fuel to generate a combustion gas, and supplies the generated combustion gas to a turbine. The gas turbine combustor includes an inner cylinder, an outer cylinder, and a burner. The inner cylinder internally forms a combustion chamber. The outer cylinder covers the inner cylinder, and forms a cylindrical outer circumferential flow path between the outer cylinder and the inner cylinder to allow the compressed air to flow. The burner is mounted on an end of the outer cylinder, the end being positioned on an opposite side to a side where the turbine is located, and the burner faces the combustion chamber. The burner includes a plurality of fuel nozzles configured to inject the fuel and a cavity configured to distribute the fuel to the fuel nozzles. The cavity is demarcated by a groove formed in a structural material of the burner to create a level difference at an opening, and a cover fitted into the level difference to close the groove. The cover is formed by a web and a flange in such a manner as to have an L-shaped or U-shaped cross-section. The web faces a bottom surface of the groove and covers the opening in the groove. The flange extends in a depth direction of the groove from an edge of the web and is fitted into the level difference. Further, the cover is joined by welding to the structural material. When viewed in a cross-section orthogonal to the groove, a cover-side inner surface that is an inner surface of the flange forming a lateral surface of the cavity is flush with a groove-side inner surface that is an inner surface of the groove that forming a lateral surface of the cavity. A boundary between the cover-side inner surface and the groove-side inner surface is away from a first corner of the cavity that is sandwiched between the cover-side inner surface and the inner surface of the web, the inner surface forming a ceiling surface of the cavity.

The present invention makes it possible to reduce thermal stress that is applied to the weld zone of a cavity formed in the structural material of a burner.

DESCRIPTION OF THE PREFERRED EMBODIMENTS

Embodiments of the present invention will now be described with reference to the accompanying drawings.

—Gas Turbine—

Figure 1:
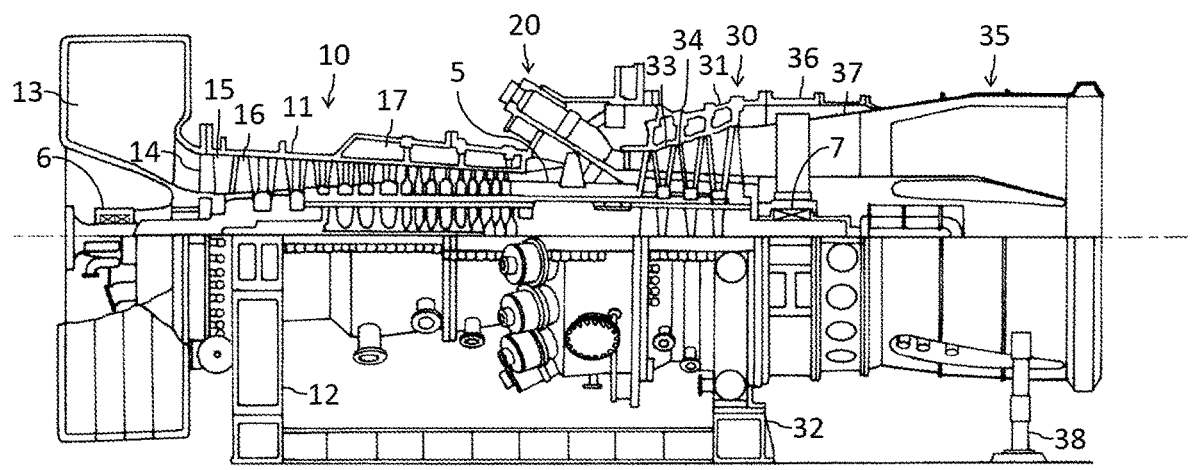
FIG. 1 is a schematic diagram illustrating an exemplary configuration of a gas turbine plant to which a gas turbine combustor according to a first embodiment of the present invention is applied.

FIG. 1 is a schematic diagram illustrating an exemplary configuration of a gas turbine plant to which a gas turbine combustor according to a first embodiment of the present invention is applied. The gas turbine depicted in FIG. 1 is a prime mover that drives load equipment, not depicted, and includes a compressor 10, a gas turbine combustor, hereinafter abbreviated as the combustor, 20, a turbine 30, and an exhaust chamber 35. A compartment of the compressor 10, or compressor compartment 11, is supported by a leg 12. A compartment of the turbine 30, or a turbine compartment 31, is supported by a leg 32. The exhaust chamber 35 is supported by a leg 38. The load equipment is typically a generator. In some cases, however, a pump is the load equipment. In general, the gas turbine may be referred to as the "gas turbine engine." In such a case, the turbine may be referred to as the "gas turbine."

The compressor 10 includes an air inlet 13 and an inlet guide vane (IGV) 14. The air inlet 13 takes in air. The inlet guide vane 14 is disposed in the compressor compartment 11. Stator blades 15 and rotor blades 16 are alternately disposed in the longitudinal direction, or in the axial direction of a rotor 5, behind the inlet guide vane 14. An extraction chamber 17 is disposed radially outward of a down-stepped section in which the stator blades 15 and the rotor blades 16 are alternately arranged. A plurality of combustors 20 are annularly disposed on the outer circumference of a gas turbine casing, or the turbine compartment 31, between the compressor 10 and the turbine 30. The turbine 30 includes a plurality of stator blades 33 and a plurality of rotor blades 34. The stator blades 33 and the rotor blades 34 are placed in the turbine compartment 31 and alternately disposed in the longitudinal direction, or in the axial direction of the later-described rotor 5. The exhaust chamber 35 is disposed downstream of the turbine compartment 31 through an exhaust compartment 36. The exhaust chamber 35 includes an exhaust diffuser 37 that is contiguous to the turbine 30.

The rotor, or rotary shaft, 5 is positioned so as to penetrate the centers of the compressor 10, combustor 20, turbine 30, and exhaust chamber 35. An end of the rotor 5 that is positioned toward the compressor 10 is rotatably supported by a bearing 6. An end of the rotor 5 that is positioned toward the exhaust chamber 35 is rotatably supported by a bearing 7. A portion of the rotor 5 that belongs to the compressor 10 is configured such that a plurality of discs are stacked in the axial direction while a plurality of rotor blades 16 are mounted on the outer circumference of each of the discs. A portion of the rotor 5 that belongs to the turbine 30 is configured such that a plurality of discs are stacked in the axial direction while a plurality of rotor blades 34 are mounted on the outer circumference of each of the discs. In the example of FIG. 1, an end of the rotor 5 that is positioned toward the exhaust chamber 35 is coupled, as an output shaft, to a drive shaft of the load equipment, not depicted.

Figure 3:
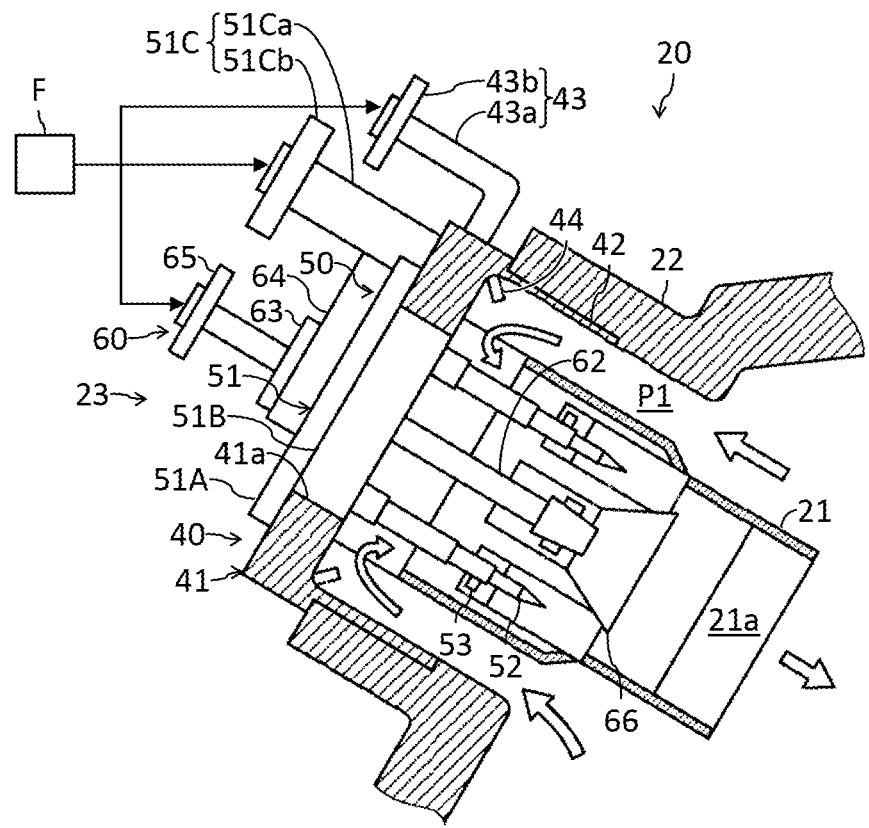
FIG. 3 is a schematic diagram illustrating a configuration of essential parts of the gas turbine combustor depicted in FIG. 2.

In the above configuration, air taken into the compressor 10 from the air inlet 13 passes through the inlet guide vane 14, a cascade of stator blades 15, and a cascade of rotor blades 16, and is then compressed to generate high-temperature, high-pressure compressed air. In the combustor 20, the fuel supplied from a fuel system, see FIG. 3, is mixed with the compressed air supplied from the compressor 10, and burned to generate a high-temperature combustion gas. The generated high-temperature combustion gas is then supplied to the turbine 30. Although a liquid fuel may be used as the fuel, it is assumed that a gaseous fuel is used as the fuel in the present embodiment. The rotor 5 is rotationally driven when the high-temperature, high-pressure combustion gas, which is a working fluid generated by the combustor 20, passes through a cascade of stator blades 33 and a cascade of rotor blades 34 in the turbine 30. The output power of the turbine 30 is partly used as motive power for the compressor 10, and the remaining output power is used as motive power for the load equipment 4. After being used to drive the turbine 30, the combustion gas is emitted through the exhaust chamber 35 as an exhaust gas. Although a single-shaft gas turbine is illustrated in conjunction with the present embodiment, the present invention is also applicable to a two-shaft gas turbine. The two-shaft gas turbine includes a high-pressure turbine and a low-pressure turbine, and the rotary shafts of the high-pressure turbine and the low-pressure turbine are separated from each other. The high-pressure turbine is coaxially coupled to the compressor, and the low-pressure turbine is coaxially coupled to the load equipment.

—Gas Turbine Combustor—

Figure 2:
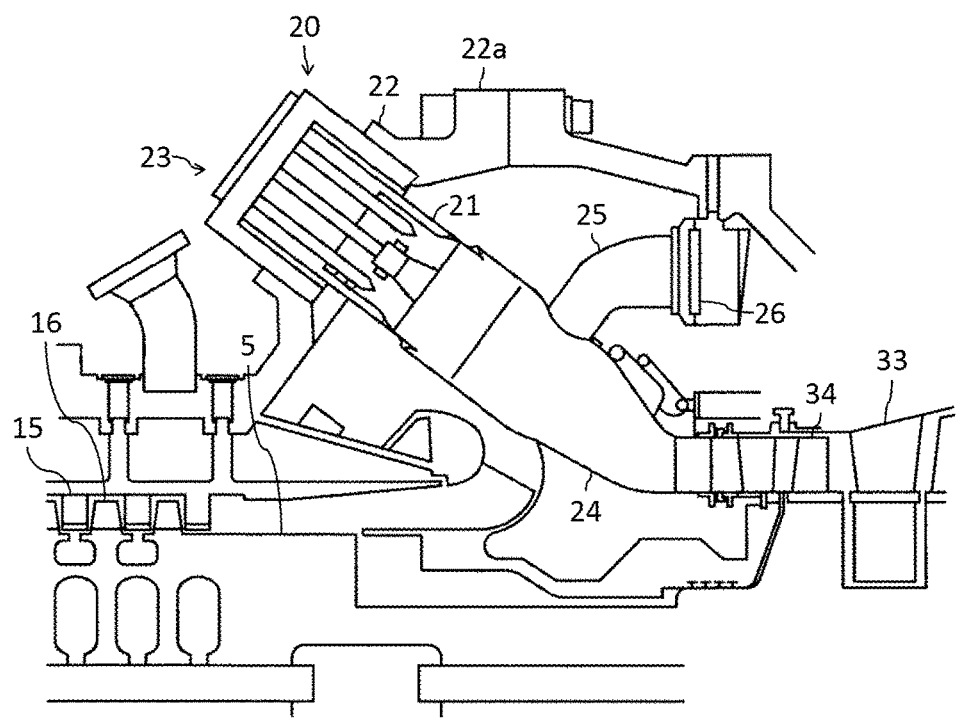
FIG. 2 is a schematic diagram illustrating a configuration of the gas turbine combustor according to the first embodiment of the present invention.

FIG. 2 is a schematic diagram illustrating a configuration of the gas turbine combustor. FIG. 3 is a schematic diagram illustrating a configuration of essential parts of the gas turbine combustor depicted in FIG. 2. Referring to FIGS. 2 and 3, a plurality of gas turbine combustors 20, or combustors 20, are disposed on the casing of the gas turbine in the circumferential direction of the casing. The combustors 20 each include, for example, an inner cylinder, or combustor liner, 21, an outer cylinder, or flow sleeve, 22, a burner 23, and a tail cylinder, or transition piece, 24, see FIG. 2.

The inner cylinder 21 is a cylindrical member that internally forms a combustion chamber 21a, see FIG. 3. The inner cylinder 21 separates the compressed air, which is supplied from the compressor 10 and flows in an outer circumferential flow path P1, from the combustion gas, which is generated in the combustion chamber 21a. An end of the inner cylinder 21 that is positioned toward the turbine, or on the right side in FIG. 3, is inserted into the tail cylinder 24, see FIG. 2. The tail cylinder 24 is a member that introduces the combustion gas, which is generated in the combustion chamber 21a, into the turbine 30. An end of the tail cylinder 24 that is positioned toward the turbine is open toward an annular working fluid flow path that the stator blades 33 and rotor blades 34 in the turbine 30 face. A bypass pipe 25, see FIG. 2, is coupled to the tail cylinder 24. The bypass pipe 25 is provided with a bypass valve 26, see FIG. 2.

The outer cylinder 22 covers the outer circumference of the inner cylinder 21, and forms the cylindrical outer circumferential flow path P1, which allows the compressed air to flow, between the outer cylinder 22 and the inner cylinder 21. The adopted configuration allows the compressed air to pass through the outer circumferential flow path P1 for convection cooling of the inner cylinder 21. Further, the outer cylinder 22 includes a flange 22a, see FIG. 2, disposed on an end on a turbine side of the outer cylinder 22 and is fastened to the casing of the gas turbine through the flange 22a. An end of the outer cylinder 22, which is positioned on a side opposite to the turbine side, or the left side in FIG. 2, is closed by the burner 23 including an end cover 40, for example. Many holes, not depicted, are formed in the outer circumferential surface of the inner cylinder 21. The compressed air flowing in the outer circumferential flow path P1 is partly introduced into the combustion chamber 21a through the many holes formed in the inner cylinder 21, and used to cool the film on the inner circumferential surface of the inner cylinder 21. The remaining compressed air, which excludes the compressed air used for cooling the film of the inner cylinder 21, flows in the outer circumferential flow path P1, is dammed and reversed by the end cover 40, and is then supplied to the burner 23. The compressed air introduced into the burner 23 is injected into the combustion chamber 21a together with the fuel, and the fuel injected with the compressed air is then burned.

—Burner—

The burner 23 including the end cover 40, a main burner 50, and a pilot burner 60 is mounted on the end on the opposite side to the turbine side of the outer cylinder 22, and faces the combustion chamber 21a while closing the end on the opposite side to the turbine side of the outer cylinder 22.

End Cover

Figure 4:
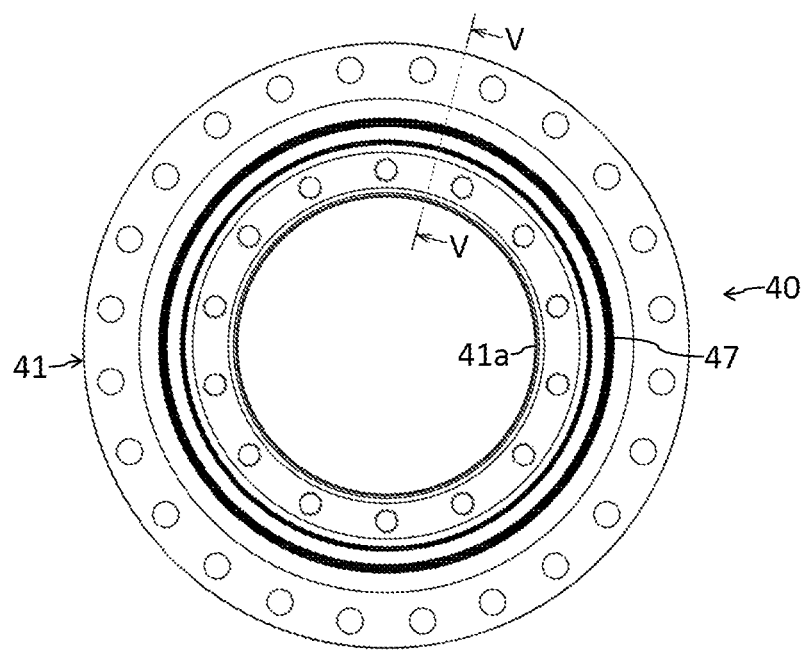
FIG. 4 is a schematic diagram illustrating a configuration of an end cover for the gas turbine combustor depicted in FIG. 2.
Figure 5:
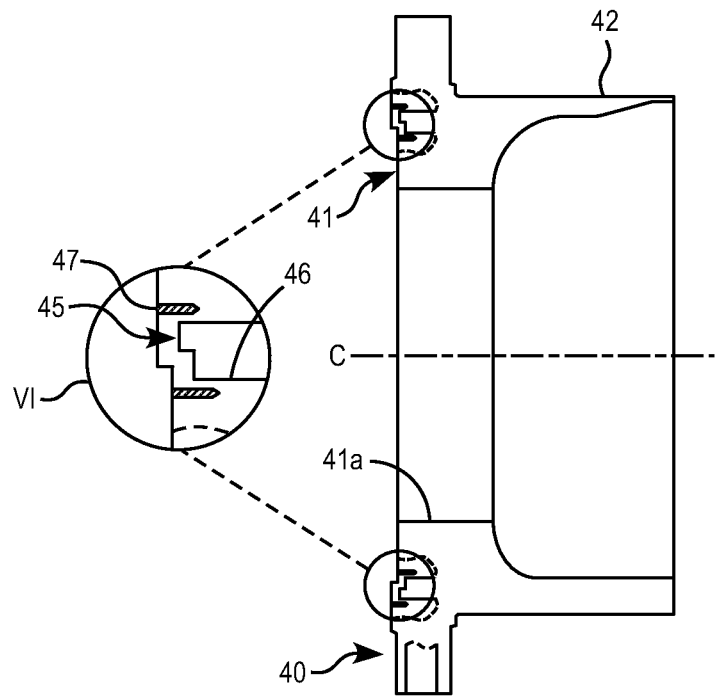
FIG. 5 is a cross-sectional view taken along line V-V in FIG. 4.
Figure 6:
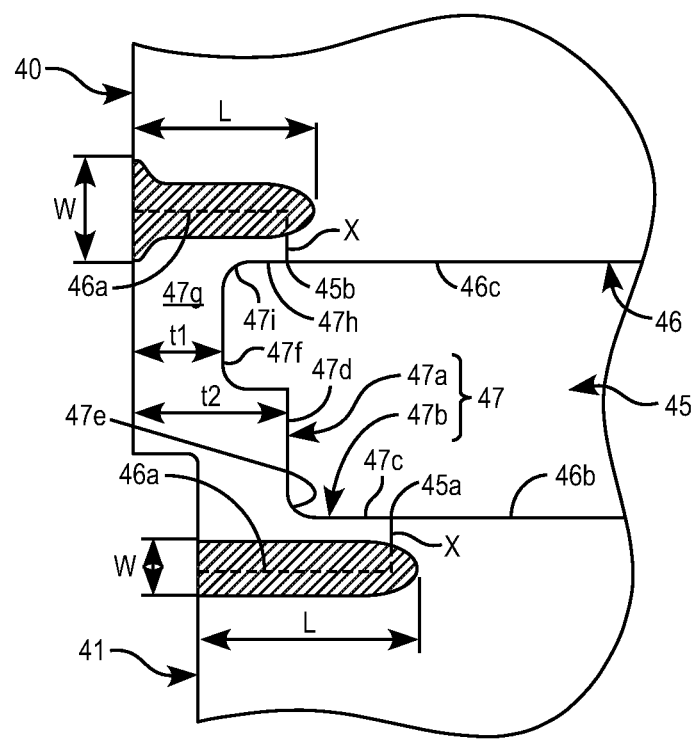
FIG. 6 is an enlarged view of section VI in FIG. 5.

FIG. 4 is a schematic diagram illustrating a configuration of the end cover. FIG. 5 is a cross-sectional view taken along line V-V in FIG. 4. FIG. 6 is an enlarged view of section VI in FIG. 5.

The end cover 40 is referred to also as the top hat. The end cover 40 includes a main body section 41, an insertion section 42, a fuel nozzle 44, see FIG. 3, and a cavity 45. The main body section 41 is shaped like an annular flange having a central hole 41a. The insertion section 42 is cylindrically shaped to have a smaller diameter than the main body section 41 and protrude toward the combustion chamber 21a from the main body section 41. While the insertion section 42 is inserted into the opening in the outer cylinder 22, the main body section 41 is bolted or otherwise fastened to the outer cylinder 22. A cylindrical space between the inner cylinder 21 and the inner circumferential surface of the insertion section 42 forms the most downstream region of the outer circumferential flow path P1. In the present embodiment, the inner circumference of the outer cylinder 22 is provided with a level difference into which the insertion section 42 fits, and the inner circumferential surface of the insertion section 42 is flush with the inner circumferential surface of the outer cylinder 22. Further, a corner section of the inner surface of the end cover 40, or more specifically, a corner section sandwiched between the inner circumferential surface of the insertion section 42 and an end face of the main body section 41 that faces the combustion chamber 21a, is circularly shaped in order to smooth the changing of the flow direction of the compressed air passed through the outer circumferential flow path P1. Furthermore, a fuel port 43, see FIG. 3, is connected to the end cover 40. The fuel port 43 includes a fuel pipe 43a extending from the outer circumferential surface of the end cover 40 and a flange 43b disposed on the end of the fuel pipe 43a. The fuel nozzle 44, see FIG. 3, injects the fuel in the outer circumferential flow path P1, and is referred to also as the top hat nozzle or the peg. A plurality of fuel nozzles 44 protrude from the corner section of the inner surface of the end cover 40 in such a manner as to face the outer circumferential flow path P1, and are circumferentially disposed at predetermined intervals.

The cavity 45 is a manifold for distributing the fuel to the fuel nozzles 44, and is demarcated by a groove 46 formed in the outer surface of the main body section 41 of the end cover 40 which is a structural material of the burner 23 and by a cover 47 closing the groove 46. The groove 46 is annularly formed so as to surround the circumference of the central hole 41a in the main body section 41 of the end cover 40, and provided with a level difference 46a, see FIG. 6, at the opening in the end face of the main body section 41 of the end cover 40, which opening is positioned on an opposite side to a side where the combustion chamber 21a is located. Although the structure of the cover 47 will be described in detail later, the cover 47 is annularly formed so as to match the groove 46, and fitted into the level difference 46a at the opening in the groove 46 to close the opening in the groove 46. The groove 46, that is, the cavity 45, communicates with the fuel port 43 and each fuel nozzle 44 so that the fuel flowing from the fuel port 43 into the cavity 45 is distributed to each fuel nozzle 44. A fuel supply system includes no fuel heating facility. Therefore, the cavity 45 is connected to a fuel supply source F, see FIG. 3, directly not via a fuel heating facility. Thus, the fuel having a normal temperature of approximately ten or more degrees is supplied to the cavity 45.

As mentioned earlier, an inlay structure using the level difference 46a is adopted for the interface between the cover 47 and the main body section 41 of the cover 40. Therefore, the contact surfaces, or the facing surfaces of mating sections, between the cover 47 and the main body section 41 are L-shaped as viewed from a cross-section orthogonal to the main body groove 46, or a cross-section cut along a plane passing through the center line C, see FIG. 5, of the end cover 40, as mentioned earlier, see FIG. 6. The cover 47 is securely fastened by welding to the main body section 41. Welding is performed along the inner and outer circumferential surfaces of the annular cover 47. In FIG. 6, the cross-hatchings represent penetration weld zones, whereas black dashed lines represent the contact surfaces, or facing surfaces, between the cover 47 and the main body section 41 in an unwelded state. Therefore, the penetration weld zones extend in the axial direction of the end cover 40, or in the left-right direction in FIG. 6, along the inner or outer circumferential surface of the cover 47. Further, in the present embodiment, an electron beam welding method is adopted to join the main body section 41 to the cover 47. Note that, a laser welding method may alternatively be adopted. Adopting the electron beam welding method makes it possible to mechanize the process of welding the main body section 41 to the cover 47. Further, as the electron beam welding method or the laser welding method is adopted to join the main body section 41 to the cover 47, the penetration depth L achieved by welding is greater than a bead width W. A portion X in which the contact surfaces do not join together may partly arise on the L-shaped contact surfaces between the main body section 41 and the cover 47, that is, a portion that faces the cavity 45 and is included in a portion extending in the radial direction of the end cover 40 toward the cavity 45 from the inner and outer circumferential surfaces of the cover 47. In the present embodiment, this portion X is likely to arise because the head width W is small.

A configuration of the cover 47 will now be described in detail. The cover 47 is formed by a web 47a and a flange 47b in such a manner as to form an L-shaped or U-shaped cross-section orthogonal to the groove 46, an L-shaped cross-section in the present embodiment. The web 47a is a portion covering the opening in the groove 46, and extends in a direction orthogonal to the center line C of the end cover 40 so as to face the bottom surface of the groove 46, that is, a surface that faces the opening in the groove 46 and is positioned on the right side in FIGS. 5 and 6. The flange 47b is an insertion section to be fitted into the level difference 46a of the groove 46, extends in the depth direction of the groove 46 from the edge of the web 47a, or from the inner circumferential edge in the present example, and is joined by welding to the main body section 41 as mentioned earlier. When viewed in a cross-section orthogonal to the groove 46, a cover-side inner surface 47c that is the inner surface of the flange 47b forming a lateral surface of the cavity 45, or a surface facing outward in the radial direction of the end cover 40 in the present example, is flush with a groove-side inner surface 46b that is the inner surface of the groove 46 forming a lateral surface of the cavity 45, because the flange 47b is fitted into the level difference 46a. Therefore, the boundary 45a between the cover-side inner surface 47c and the groove-side inner surface 46b is positioned away, or displaced, in the direction of the center line C from a first corner 47e of the cavity 45 that is sandwiched between the cover-side inner surface 47c and a ceiling surface 47d of the cavity 45 formed by the web 47a. The first corner 47e is circularly shaped, and this also holds true for a later-described second corner 47i and other corner sections.

Further, the ceiling surface 47d of the web 47a of the cover 47 has a recess 47f. A thin section 47g is formed by creating the recess 47f to hollow the cover 47. The thickness t1 of the thin section 47g is smaller than the thickness t2 of an adjacent portion adjacent to the thin section 47g of the web 47a. Here, the "adjacent portion" is adjacent to the thin section 47g, and an end face of the "adjacent portion," which end face is positioned on an opposite side to a side where the combustion chamber 21a is located, is flush with an end face of the thin section 47g, which end face is similarly positioned on the opposite side to the side where the combustion chamber 21a is located. The recess 47f is positioned outward in the radial direction of the end cover 40 within the cavity 45, and fitted into the level difference 46a. Accordingly, a radially outward inner surface 47h of the recess 47f is flush with a radially outward inner surface 46c of the groove 46. The boundary 45b between the inner surface 46h of the recess 47f and the inner surface 46c of the groove 46 is positioned away, or displaced, in the direction of the center line C from the second corner 47i of the cavity 45 that is sandwiched between the inner surface 47h formed by the recess 47f and the ceiling surface 47d.

Main Burner

Figure 7:
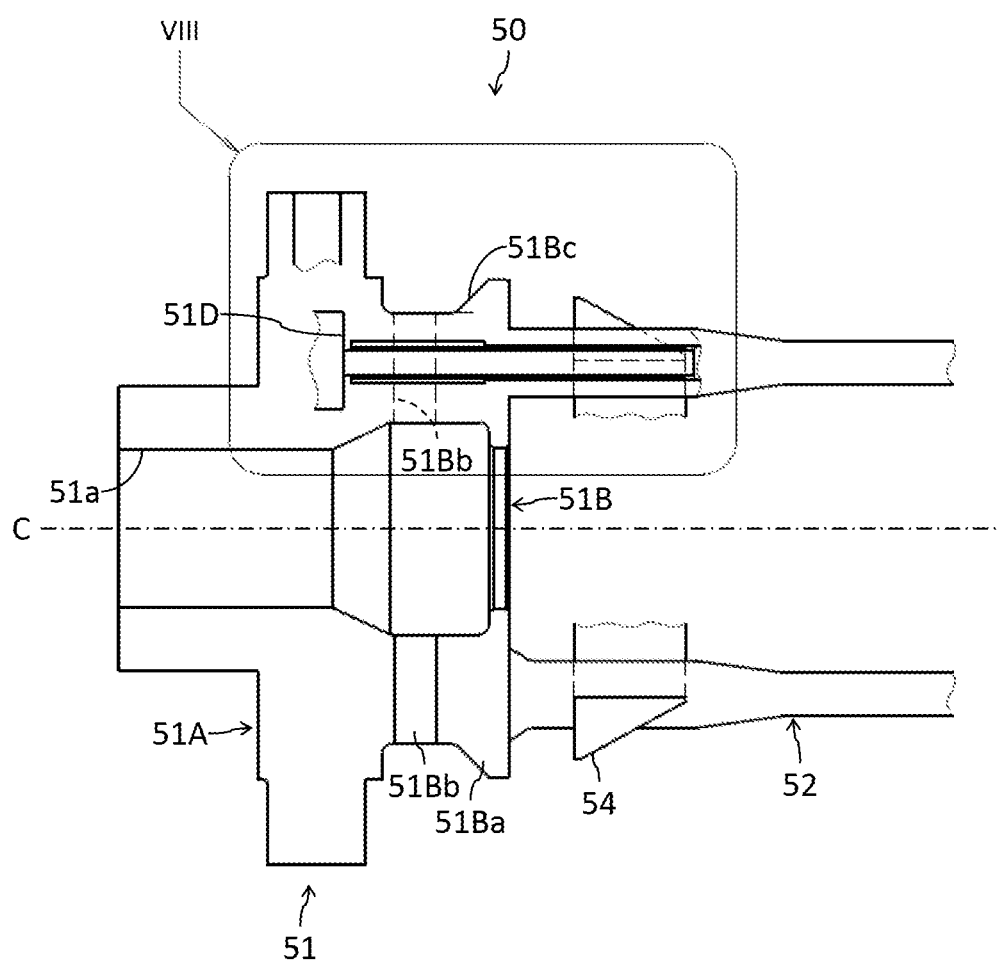
FIG. 7 is a partial sectional view of a main burner of the gas turbine combustor depicted in FIG. 2.
Figure 8:
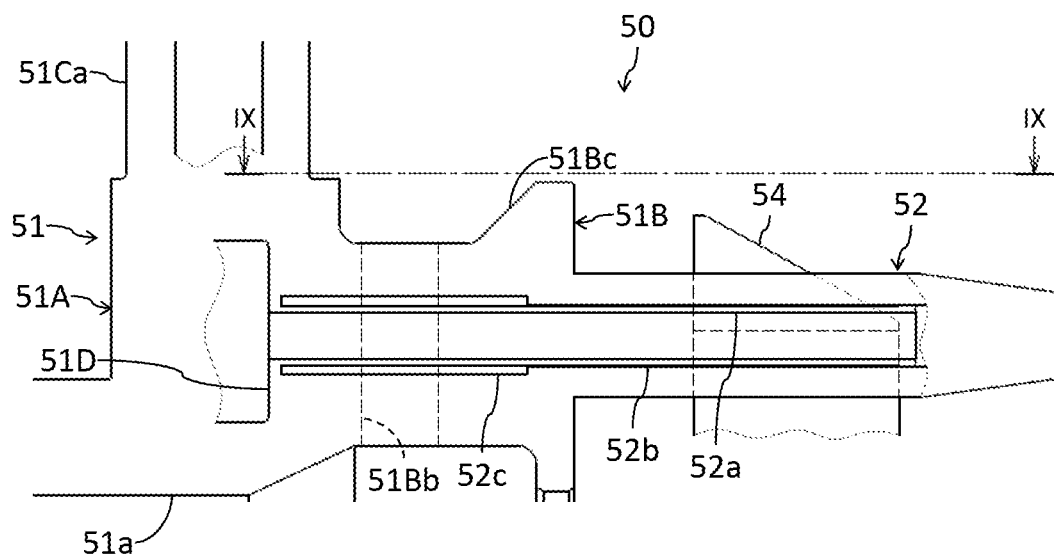
FIG. 8 is an enlarged view of section VIII in FIG. 7, or an enlarged view of essential parts.
Figure 9:
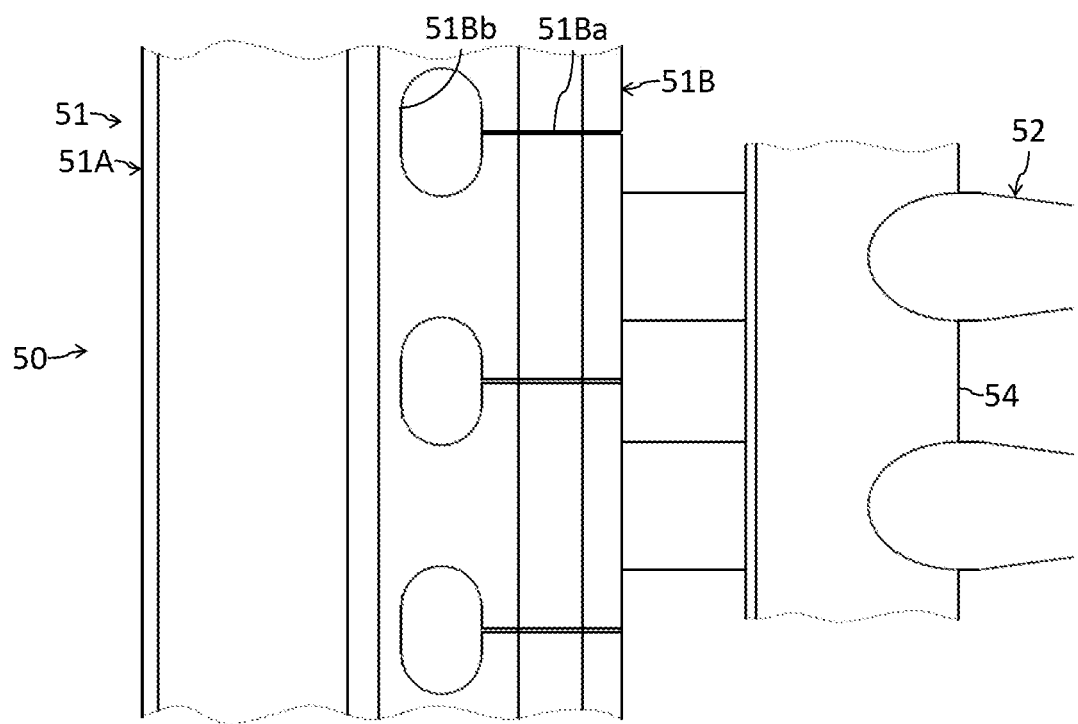
FIG. 9 is a cross-sectional view taken along line IX-IX in FIG. 8.

FIG. 7 is a partial sectional view of the main burner. FIG. 8 is an enlarged view of section VIII in FIG. 7, or an enlarged view of essential parts. FIG. 9 is a cross-sectional view taken along line IX-IX in FIG. 8. Line IX-IX represents the outer circumferential surface of a cylinder centered around a combustor central axis, and FIG. 9 corresponds to a drawing of a two-dimensionally expanded cylindrical cross-section. Further, FIG. 9 presents an external view of the vicinity of a later-described rectifier plate 54 instead of its cross-sectional view. The main burner 50 includes a base frame 51, a fuel nozzle 52, and the rectifier plate 54.

The base frame 51 is shaped like a cylinder having a central hole 51a. The base frame 51 includes a flange 51A, a nozzle base 51B, and a cavity 51D. The flange 51A is shaped like a disc having the central hole 51a at the center. The nozzle base 51B is smaller in diameter than the flange 51A, and shaped like a cylinder the center of which is provided with the central hole 51a. The nozzle base 51B protrudes toward the combustion chamber 21a from an end face of the flange 51A, which end face is positioned toward the combustion chamber 21a, or the right side in FIG. 7. The base frame 51 is configured such that the flange 51A is bolted or otherwise fastened to the end cover 40 while the nozzle base 51B is inserted into the central hole 41a in the end cover 40 from a side opposite to a side where the combustion chamber 21a is located. Further, the flange 51A is connected to a fuel port 51C, see FIG. 3. The fuel port 51C includes a fuel pipe 51Ca extending from the outer circumferential surface of the flange 51A and a flange 51Cb disposed on the end of the fuel pipe 51Ca. The cavity 51D is a manifold for distributing the fuel to a plurality of fuel nozzles 52, and is annularly formed in the flange 51A, which is a structural material of the burner 23, in such a manner as to surround the central hole 51a. The cavity 51D communicates with the fuel port 51C and each fuel nozzle 52 so that the fuel flowing into the cavity 51D from the fuel port 51C is distributed to each fuel nozzle 52. As mentioned earlier, the fuel supply system includes no fuel heating facility. Further, the cavity 51D is connected to the fuel supply source F, see FIG. 3, directly not via a fuel heating facility. Thus, the fuel having a normal temperature of approximately ten or more degrees is supplied to the cavity 51D. Although not depicted in detail, a configuration adopted in some cases may be such that the fuel nozzles 52 are divided into a plurality of groups, and that fuel supply paths are separately provided for the groups, and further that fuel injection and shut-off are valve-controlled on an individual group basis. In such cases, a plurality of annular cavities may be formed for the individual groups, or one annular cavity may be divided into a plurality of cavities for the individual groups.

As viewed from the combustion chamber 21a, a plurality of radially extended slits 51Ba are formed on the nozzle base 51B of the base frame 51. The slits 51Ba are radially arranged and circumferentially disposed at predetermined intervals. As depicted in FIG. 9, the fuel nozzles 52 and the slits 51Ba are alternately disposed in the circumferential direction such that the slits 51Ba each separate the circumferentially adjacent fuel nozzles 52 from each other. Further, a plurality of radially penetrating through-holes 51Bb are circumferentially disposed on the nozzle base 51B of the base frame 51 at predetermined intervals. The cross-section of the through-holes 51Bb is shaped like an oval having a circumferentially extended long axis. However, the cross-section of the through-holes 51Bb may be of any shape as far as it is smooth without angles, circular in shape, or shaped like an oval having a circumferentially extended long axis. The slits 51Ba each extends toward the flange 51A from an end face of the nozzle base 51B, which end face is positioned toward the combustion chamber 21a, and are connected to the through-holes 51Bb. The through-holes 51Bb and the slits 51Ba correspond to each other on a one-to-one basis. As described above, a portion of the nozzle base 51B, which portion is positioned toward the flange 51A rather than the through-holes 51Bb, is integrally formed, whereas a portion of the nozzle base 51B, which portion is positioned toward the combustion chamber 21a rather than the through-holes 51Bb, is circumferentially divided into multiple sections by the slits 51Ba.

Further, a circumferentially extended hollow 51Bc is formed on the outer circumferential surface of the nozzle base 51B. The hollow 51Bc, which is annularly formed to surround the central hole 51a in the base frame 51, thins a radially outer portion of a fuel passage 52a described later, of the nozzle base 51B, and shortens the distance between the fuel passage 52a and the outer circumferential surface of the nozzle base 51B. The cross-sectional shape of the hollow 51Bc is such that its wall surface toward the combustion chamber 21a is tilted radially outward toward the combustion chamber 21a while the opposing wall surface is positioned along a plane orthogonal to the center line C of the base frame 51.

The fuel nozzles 52 inject the fuel into the combustion chamber 21a through associated burner tubes 55, see FIG. 3. The fuel nozzles 52 are referred to also as the main nozzles. The fuel nozzles 52 are configured such that the base end side is inserted into the nozzle base 51B while the tip end is protruded toward the combustion chamber 21a from an end face of the nozzle base 51B, which end face faces the combustion chamber 21a. The fuel nozzles 52 are fastened by welding to the end face of the nozzle base 51B, which end face faces the combustion chamber 21a. Further, the middle portions of the fuel nozzles 52 are coupled to each other by the rectifier plate 54 that surrounds the fuel nozzles 52. The rectifier plate 54 is also joined by welding to the fuel nozzles 52.

As mentioned earlier, the fuel nozzles 52 are arranged in such a manner that one fuel nozzle 52 is disposed between the circumferentially adjacent slits 51Ba. As viewed from the combustion chamber 21a, the fuel nozzles 52 are disposed in a circular manner. The fuel nozzles 52 each internally include one fuel passage 52a. The inlet of the fuel passage 52a is open to the cavity 51D, and the outlet is open to the tip end of the fuel nozzle 52. In the present embodiment, the fuel nozzles 52 each have a double tube structure for at least a portion passing through the nozzle base 51B, and include an outer tube 52c that is disposed outside of an inner tube 52b acting as the fuel passage 52a. The outer tube 52c forms a cylindrical air heat insulation layer between the inner tube 52b and the outer tube 52c.

Pilot Burner

The pilot burner 60, see FIG. 3, includes a base frame 61 and a fuel nozzle 62. The base frame 61 includes a flange 63, a nozzle base 64, and a fuel port 65. The base frame 61 is configured such that the flange 63 is bolted or otherwise fastened to the base frame 51 while the nozzle base 64 is inserted into the central hole 51a in the base frame 51 of the main burner 50 from a side opposite to a side where the combustion chamber 21a is located. The fuel nozzle 62 referred to also as the pilot nozzle protrudes toward the combustion chamber 21a from the nozzle base 64, and is positioned at the center of the main burner 50 having annularly disposed fuel nozzles 62. The fuel port 65 extends from the flange 63 and is connected to the fuel nozzle 62. The fuel supplied from the fuel port 65 is injected from the fuel nozzle 62 into the combustion chamber 21a through a pilot cone 66. As mentioned earlier, the fuel supply system includes no fuel heating facility, and therefore, the fuel having a normal temperature of approximately ten or more degrees is supplied to the fuel nozzle 62.

—Operation—

During an operation of the gas turbine, air is taken into the compressor 10 and compressed. The resulting high-pressure compressed air is then discharged from the compressor 10. The compressed air discharged from the compressor 10 is supplied to the combustor 20, and the fuel supplied from the fuel system and mixed with the compressed air is burned, see FIG. 3. Consequently, the resulting high-temperature combustion gas drives the turbine 30. The rotational output power of the turbine 30 then drives the load equipment.

—Advantages—

(1) The structure adopted in the present embodiment is such that the cover 47 of the cavity 45 is formed by the web 47a and the flange 47b to have an L-shaped cross-section while the boundary 45a between the cover-side inner surface 47c and groove-side inner surface 46b of the cavity 45 is displaced from the first corner 47e of the cavity 45. The boundary 45a might be away from a penetration weld zone and turned out to be a cracked unwelded portion X. However, the stress applied to the weld zone through the portion X can be reduced by shifting the portion X from a corner, or the first corner 47e, of the wall surface of the cavity 45 at which particularly thermal stress concentrates. As described above, the thermal stress applied to the weld zone of the cavity 45 of the burner 23 can be reduced to improve the reliability of the burner 23.

(2) The web 47a of the cover 47 includes the thin section 47g. Therefore, when stress is applied to the vicinity of the cavity 45, the thin section 47g deforms prior to the deformation of the other sections to reduce the stress applied to the unwelded portion X. This also contributes to improve the reliability of the burner 23. Further, the recess 47f forming the thin section 47g is disposed toward the cavity 45 of the web 47a, namely, disposed on a side that is near the flow path of compressed air and subjected to a significant amount of deformation. Therefore, a higher stress absorption effect can be achieved than a case where the recess 47f is disposed on an opposite side to a side where the cavity 45 is located. However, as far as the above-described basic advantage (1) is obtained, the thin section 47g is not always required. It is possible to adopt a configuration where, for example, the thickness of the web 47a is constant.

(3) Although the web 47a is L-shaped in the present embodiment, the recess 47f forming the thin section 47g is positioned close to a corner in the cavity 45 so that the inner surface 47h of the recess 47f is flush with the inner surface 46c of the groove 46. When, as described above, the boundary 45b between the inner surfaces 47h and 46c is positioned away from the second corner 47i of the cavity 45 formed by the recess 47f, it is possible to reduce the thermal stress applied to the weld zone of the cavity 45 of the burner 23, as is the case with the above advantage (1).

(4) In the present embodiment, the fuel system includes no fuel heating facility, and the fuel having a normal temperature is supplied to the cavity 45. Meanwhile, the compressed air supplied from the compressor 10 has a temperature higher than 400° C. Thus, the thermal stress applied to the circumference of the cavity 45 tends to increase due to a significant temperature difference between the fuel and the compressed air. Consequently, it is particularly meaningful to adopt a thermal stress reduction structure described in conjunction with the above advantage (1).

(5) In the present embodiment, the welding bead width W is small because the cover 47 is welded by the electron beam welding method or the laser welding method. Therefore, the unwelded portion X is likely to arise on L-shaped facing portions between the cover 47 and the main body section 41 of the end cover 40. In this respect, too, it is particularly meaningful to adopt the thermal stress reduction structure described in conjunction with the above advantage (1). Further, when the thin section 47g is formed on the cover 47, the bead width W is small. This makes it possible to reduce welding heat input to the thin section 47g. That is to say, the degree of freedom in shaping the cover 47 can be increased. Consequently, the thin section 47g can be reasonably formed on the cover 47.

(6) Furthermore, in the present embodiment, a plurality of slits 51Ba are formed in the nozzle base 51B of the main burner 50 such that each separate the circumferentially adjacent fuel nozzles 52 from each other. In some cases, thermal stress distribution may be biased when the fuel is unevenly distributed to particular fuel nozzles 52 only during, for example, a partial load operation. Even in such cases, when the nozzle base 51B is partially divided at the base of the fuel nozzles 52, the divided portions of the nozzle base 51B deform and tilt in the circumferential direction, whereby part of the force of toppling the fuel nozzles 52 with respect to the nozzle base 51B is absorbed. Additionally, the transmission of deformation between the adjacent fuel nozzles 52 can be interrupted by the slits 51Ba. Consequently, the stress applied to the nozzle base 51B and the weld zone for welding the rectifier plate 54 to the fuel nozzles 52 can be dispersed to reduce the concentration of thermal stress on the burner 23. However, the slits 51Ba in the nozzle base 51B are not always required as far as the above advantage (1) is obtained.

(7) Ends of the slits 51Ba, which ends are positioned on an opposite side to a side where the combustion chamber 21a is located, are connected to the through-holes 51Bb. Thus, the ends of the slits 51Ba are circularly shaped by the inner circumferential surfaces of the through-holes 51Bb. When thermal deformation occurs, stress concentrates on the ends of the slits 51Ba. Therefore, the circularly shaped ends of the slits 51Ba reduce the stress concentration more effectively. Particularly, when the through-holes 51Bb are shaped like a circumferentially long oval as depicted in FIG. 9, a high stress distribution effect is achieved. However, the through-holes 51Bb in the nozzle base 51B are not always required as far as the above advantage (1) is obtained.

(8) The hollow 51Bc is formed on the outer circumferential surface of the nozzle base 51B. This thins a section between a compressed air existence domain of the nozzle base 51B and the fuel passage 52a, or an outer circumferential section with respect to the fuel passage 52a. As a result, the thermal capacity of the section can be reduced. This makes it possible to reduce the temperature difference in the structural material of the nozzle base 51B in the vicinity of the fuel passage 52a. Consequently, the stress concentration can be reduced more effectively. However, the hollow 51Bc in the nozzle base 51B is not always required as far as the above advantage (1) is obtained.

(9) The cylindrical air heat insulation layer is provided for the fuel nozzles 52. This reduces the transfer of heat between the fuel distributed through the fuel nozzles 52 and the material of the nozzle base 51B. This makes it possible to reduce the thermal stress that is applied to the nozzle base 51B due to the temperature difference between the compressed air and the fuel. This advantage also contributes to reduce the stress concentration. However, the air heat insulation layer of the fuel nozzles 52 is not always required as far as the above advantage (1) is obtained.

—Exemplary Modifications—

The above-described examples assume that the flange 47b or the thin section 47g is provided for the cover 47 of the cavity 45 in the end cover 40. However, such a structure is also applicable to a cavity formed in other structural materials of the burner 23, e.g., the cavity 51D in the main burner 50. A case where the cover 47 is L-shaped as viewed cross-sectionally has been exemplified. However, the cover 47 may alternatively be U-shaped as viewed cross-sectionally and configured such that the flange 47b is attached to the inner and outer circumferences, which are joined by the web 47a.

What is claimed is:

1. A gas turbine combustor that receives compressed air discharged from a compressor, mixes the compressed air with a fuel, burns a mixture of the compressed air and the fuel to generate a combustion gas, and supplies the generated combustion gas to a turbine, the gas turbine combustor comprising:
   an inner cylinder configured to form a combustion chamber therein;
   an outer cylinder configured to cover the inner cylinder and form a cylindrical outer circumferential flow path between the outer cylinder and the inner cylinder to allow the compressed air to flow; and
   a burner that is mounted on an end of the outer cylinder, the end being positioned on an opposite side to a side where the turbine is located, and that faces the combustion chamber, wherein
      the burner includes a plurality of fuel nozzles configured to inject the fuel, and a cavity configured to distribute the fuel to the fuel nozzles,
      the cavity is demarcated by a groove formed in a structural material of the burner to create a level difference at an opening, and a cover fitted into the level difference to close the groove,
      the cover is formed by a web and a flange and joined by welding to the structural material in such a manner as to have an L-shaped or U-shaped cross-section, the web facing a bottom surface of the groove and covering the opening in the groove, the flange extending in a depth direction of the groove from an edge of the web and fitted into the level difference,
      when viewed in a cross-section orthogonal to the groove, a cover-side inner surface that is an inner surface of the flange is flush with a groove-side inner surface that is an inner surface of the groove, the cover-side inner surface and the groove-side inner surface together forming a lateral surface of the cavity, and
   a boundary between the cover-side inner surface and the groove-side inner surface is spaced away from a first corner of the cavity that is sandwiched between the cover-side inner surface and an inner surface of the web, the inner surface of the web forming a ceiling surface of the cavity.

2. The gas turbine combustor according to claim 1, wherein
   the web of the cover includes a thin section that is thinner than a section adjacent to the thin section of the web.

3. The gas turbine combustor according to claim 2, wherein
   the ceiling surface of the cavity formed by the web has a recess that forms the thin section.

4. The gas turbine combustor according to claim 3, wherein an inner surface of the recess is flush with an other inner surface of the groove, and an other boundary between the inner surface of the recess and the other inner surface of the groove is spaced away from a second corner of the cavity formed by the recess.

5. The gas turbine combustor according to claim 1, wherein the cavity is connected to a fuel supply source directly not via a fuel heating facility.

6. The gas turbine combustor according to claim 1, wherein
   the welding is performed by a laser welding method or an electron beam welding od.

7. The gas turbine combustor according to claim 1, wherein
   a penetration depth achieved by the welding is greater than a bead width.

8. A gas turbine comprising:
   a compressor configured to compress air to generate compressed air;
   the gas turbine combustor according to claim 1 that receives compressed air discharged from the compressor, mixes the compressed air with a fuel, and burns a mixture of the compressed air and the fuel to generate a combustion gas; and
   a turbine configured to be driven by the combustion gas supplied from the gas turbine combustor.

* * * * *